(12) United States Patent
Ledford et al.

(10) Patent No.: US 10,710,344 B2
(45) Date of Patent: Jul. 14, 2020

(54) WELDABLE, FULLY ADHERED WATERPROOFING MEMBRANE SYSTEM FOR BLINDSIDE WATERPROOFING APPLICATIONS

(71) Applicant: CARLISLE CONSTRUCTION MATERIALS, LLC, Carlisle, PA (US)

(72) Inventors: John Ledford, Wylie, TX (US); Brian Gish, Carlisle, PA (US); Ross Vinson, The Colony, TX (US); Tony Vitale, Hampton, NY (US); Peter DiGiovanni, Malden, MA (US); Justin Tepera, Dallas, TX (US); Steve Velten, Plano, TX (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 16/696,260

(22) Filed: Nov. 26, 2019

(65) Prior Publication Data
US 2020/0171805 A1    Jun. 4, 2020

Related U.S. Application Data

(60) Provisional application No. 62/775,262, filed on Dec. 4, 2018.

(51) Int. Cl.
| | |
|---|---|
| *B32B 7/02* | (2019.01) |
| *B32B 27/08* | (2006.01) |
| *E04D 5/10* | (2006.01) |
| *E04D 12/00* | (2006.01) |
| *B32B 7/12* | (2006.01) |

(52) U.S. Cl.
CPC ............ *B32B 27/08* (2013.01); *B32B 7/12* (2013.01); *E04D 5/10* (2013.01); *E04D 12/002* (2013.01); *B32B 2419/06* (2013.01)

(58) Field of Classification Search
CPC ............................. C09J 2201/28; B32B 7/02
See application file for complete search history.

(56) References Cited

U.S. PATENT DOCUMENTS

| | | | |
|---|---|---|---|
| 4,751,122 A | * | 6/1988 | May .................. E04B 1/665 428/40.3 |
| 7,776,177 B2 | | 8/2010 | Hubbard |
| 8,562,769 B2 | | 10/2013 | Kraus et al. |

(Continued)

FOREIGN PATENT DOCUMENTS

WO    2017165871 A1    9/2017

OTHER PUBLICATIONS

International Searching Authority, International Search Report and Written Opinion for corresponding International Application No. PCT/US2019/062999, dated Feb. 6, 2020, 6 pages.

*Primary Examiner* — Lawrence D Ferguson
(74) *Attorney, Agent, or Firm* — Gordon Rees Scully Mansukhani LLP; David R. Heckadon

(57) ABSTRACT

A membrane system, having a waterproof woven polymer reinforcing scrim disposed between two layers of a thermoplastic polymer membrane; and an optional layer of concrete activated adhesive applied on top of a center portion, but not to the edges of the thermoplastic polymer membrane so that the edges of adjacent membranes can be thermally welded together to form a waterproof seal for use in blindside waterproofing or roofing applications.

10 Claims, 3 Drawing Sheets

(56) References Cited

U.S. PATENT DOCUMENTS

| | | | |
|---|---|---|---|
| 2003/0100233 A1* | 5/2003 | Fynan | D04H 3/12 |
| | | | 442/58 |
| 2007/0186505 A1* | 8/2007 | Hubbard | E04D 5/12 |
| | | | 52/741.4 |
| 2011/0311797 A1 | 12/2011 | Worthen et al. | |
| 2014/0150960 A1* | 6/2014 | Peng | B32B 27/00 |
| | | | 156/244.11 |
| 2017/0203555 A1 | 7/2017 | Wang et al. | |

\* cited by examiner

WELDABLE, FULLY ADHERED WATERPROOFING MEMBRANE SYSTEM FOR BLINDSIDE WATERPROOFING APPLICATIONS

RELATED APPLICATION

The present application claims priority to U.S. Provisional Patent Application No. 62/775,262, entitled Weldable, Fully Adhered Weatherproofing Membrane System for Blindside Waterproofing Application, filed Dec. 4, 2018, the entire disclosure of which is incorporated herein by reference in its entirety for all purposes.

TECHNICAL FIELD

The present invention relates to waterproofing systems for membranes such as Thermoplastic Polyolefin (TPO) membranes. The present invention can be used in various applications including blindside waterproofing of building foundations, and optionally in roofing applications as well.

SUMMARY OF THE INVENTION

The present invention provides a fully adhered TPO membrane system that is waterproofed with an internal scrim layer to withstand hydrostatic pressure from water. In the present system, a thermoplastic polymer membrane (preferably TPO) is reinforced with a thermally annealed, coated scrim. This scrim layer is surprisingly resistant to hydrostatic pressure, thereby providing a waterproof membrane structure (even if the scrim becomes damaged). In preferred embodiments, the present scrim-reinforced TPO membrane resists up to 100 psi hydrostatic head pressure, even when the scrim is somewhat damaged. In optional aspects of the present system, EPDM or PVC can be used instead of TPO.

In one preferred use, the present scrim-reinforced TPO membrane is used for "blindside waterproofing". Generally speaking, blindside waterproofing refers to the situation where waterproofing is required, but access to the positive side is impossible due to a soil retention system. For example, blindside waterproofing typically includes the scenario where waterproofing is first installed below ground level and before a building's concrete foundation is poured thereover. In such applications, the present membrane system advantageously provides a waterproof seal around the poured concrete to eliminate moisture passing into the building.

One advantage of the present system is that it uses thermally welded seams at the edges of the TPO membrane. As such, the TPO membranes can be adhered side-by-side to one another. As such, the present TPO membrane may first be laid out on the ground in sections with the edges of the adjacent membrane sections overlapping one another. Next, thermally welding these edges together provides a tight, waterproof seal. Finally, the concrete can be poured over the top of the TPO membranes to provide the building foundation (with a waterproofing layer underneath). In optional aspects, blindside waterproofing can also include vertical wall hanging applications.

Preferably, a concrete-activated adhesive is used on top of the TPO membrane. It is to be understood, however, that other suitable adhesives can also be used for different waterproofing applications, all depending upon the particular materials being used, and all keeping within the scope of the present invention. An advantage of using a concrete-activated adhesive is its adhesion onto the concrete itself. Such adhesion tightly seals the membrane to the concrete layer and thereby prevents any water intrusion between the TPO membrane and the concrete.

As stated above, adjacent sections of the present membrane material can be thermally welded together. This has the advantage of providing a very strong seal between the adjacent sections of the present scrim-reinforced TPO membranes. Accordingly, water passage both down vertically through the scrim-reinforced TPO membrane is inhibited (by the scrim itself, as will be explained) and also horizontally between the overlapping edges of adjacent sections of the TPO membranes (by the thermally welded seals at the edges of the TPO membranes).

Currently, blindside waterproofing membranes do exist that are mechanically adhered to concrete foundations and have thermally welded seams. Unfortunately, with these existing membrane systems, water can still migrate horizontally between the mechanically fastened membrane and the surface of the concrete. Other existing systems are fully adhered to the concrete foundation, but these systems only have adhesively taped seams at their edges, which are not as durable as the present thermally welded seams. In contrast, the present system uses a concrete activated adhesive that fully adheres to the concrete, except at the edges, which therefore allows for the edges of each TPO membrane to be thermally welded to an adjacent TPO membrane.

As can be understood, the present scrim reinforcement (which is preferably disposed within the TPO membrane itself) provides waterproofing that both limits migration of water vertically through the scrim and horizontally either between a concrete foundation and the fully adhered membrane and the fully adhered membrane.

An additional benefit of the present scrim reinforcement within the TPO membrane itself is that the resulting thermoplastic membrane is tough, puncture resistant and damage resistant.

In preferred aspects of the present system in which an adhesive layer is applied to the majority of the surface of the thermoplastic polymer membrane, an optional release layer may be provided over the adhesive. As a result, the present thermoplastic polymer membrane can conveniently be rolled up and delivered to a jobsite.

In preferred aspects of the present system (i.e.: when a concrete foundation is poured thereover), the adhesive layer is applied only to the majority of the surface of the thermoplastic polymer membrane. Importantly however, this adhesive layer is preferably not applied outwardly towards the very edges of the thermoplastic polymer membrane. Instead, a gap (preferably on the order of 3 to 6 inches) remains at the edges of the thermoplastic polymer membrane where the adhesive is not applied. As a result, overlapping edges of sections of the adjacent thermoplastic polymer membranes can be thermally welded together. As such, the seams of the present thermoplastic polymer membrane product are not coated with adhesives, such that they can be thermally welded to one another. Such thermal welding has the advantage of producing a much stronger seal (as compared to traditional taped seams). In these applications, the scrim will reinforce the thermoplastic TPO membrane such that the membrane will be substantially more puncture resistant. This puncture resistance is beneficial both during installation (i.e.: when workers are walking on the roof) and also during hailstorms and extreme weather.

In other optional aspects, the present membrane can instead be laid out on a building roof (i.e.: on top of insulation blocks or other building surfaces) in sections with the edges of adjacent membrane sections overlapping one another. Thermally welding the overlapping edges together provides a tight, waterproof seal. The scrim reinforcement (disposed within the TPO membrane) provides waterproofing that both limits migration of water vertically through the scrim and horizontally either between the roofing building insulation blocks and the fully adhered membrane.

In such roofing applications, an additional benefit of the scrim reinforcement within the TPO membrane itself is that the resulting thermoplastic membrane is tough, puncture resistant and damage resistant. In the present system, the scrim will reinforce the thermoplastic TPO membrane such that the membrane will be substantially more puncture resistant. This puncture resistance is beneficial both during installation (i.e.: when workers are walking on the roof) and also during hailstorms and extreme weather.

Preferably, the reinforcing scrim is a woven polyester. As such, the present scrim is wick resistant, even under hydrostatic pressure. Preferably, the reinforcing scrim is annealed and coated with EVA, polyolefins, polyacrylates and/or similar materials. Preferably, the scrim is also pressed to flatten it and to seal the surface of the scrim's woven threads. An advantage of pressing the scrim flat is that the resulting scrim-reinforced TPO membrane lies flatter than its unreinforced alternative. Additionally, the edges of the scrim can be sewn together to avoid fraying during processing. In preferred embodiments, the entire assembly is about 45 mils thick, with each of the upper and lower TPO membranes being on the order of 10 to 25 mils thick.

In certain preferred embodiments, the reinforcing scrim is a 9×9 polyester 1000 denier or equivalent material that preferably provides 15.5 Lbf single end breaking strength when annealed and coated. In one preferred embodiment, the polyester scrim fabric has 9 wales per inch and 9 courses with 70 denier yarn and approved equivalents. Preferably, the selveges are knitted to avoid the fabric unravelling. As stated above, the present scrim is preferably thermally annealed by flattening it with heat and pressure. This annealing process seals the outer surface of the scrim, thereby reducing the risk of water passage through the channels formed by the threads of the fabric.

Optionally, a coating of a mixture of EVA, polyolefins, polyacrylates and/or similar materials is applied to the finished scrim to improve the bonding of the TPO layers to the scrim. This is a significant advantage over traditional anti-wick polyesters with hydrophobically treated fibers since these traditional scrim materials have significant channels open between the fibers, permitting water penetration. The present inventors have found the present coated and annealed scrim to advantageously allow a damaged TPO membrane system to withstand 100 psi hydrostatic pressure for a period of time on the order of 24 to 48 hours with minimal water migration. In contrast, traditional (i.e.: non-coated, non-annealed) scrims will not even withstand 5-10 psi hydrostatic pressure in a TPO membrane.

In one preferred method of manufacturing the present TPO membrane system, a layer of TPO is extruded onto either side of the scrim, thereby providing a membrane structure with the scrim positioned between the two coextruded layers of TPO. Accordingly, a reinforced composite is formed.

DETAILED DESCRIPTION OF THE DRAWINGS

Figure 1:
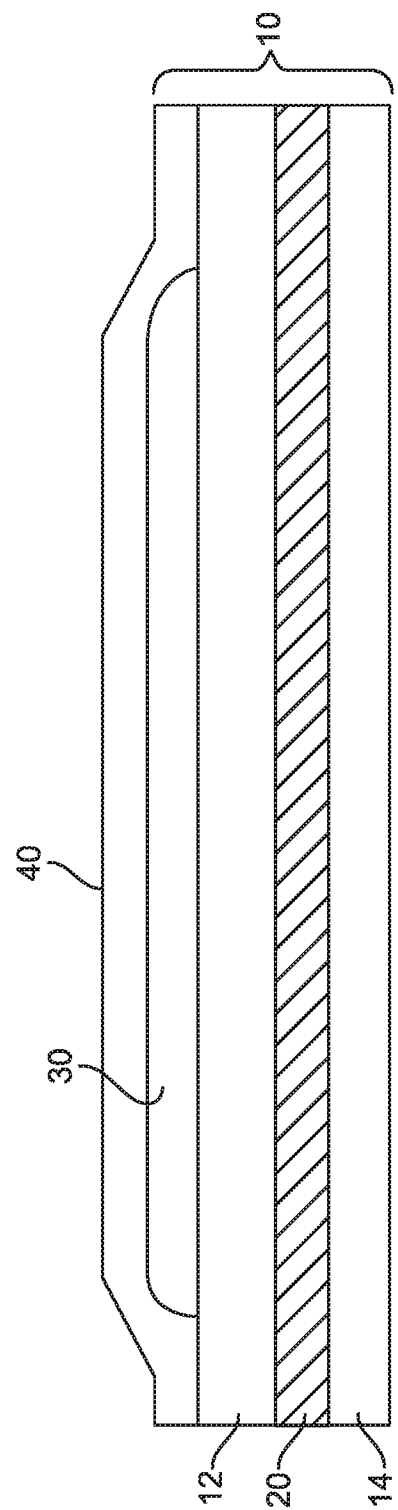
FIG. 1 is a sectional side elevation view of the present membrane system.

FIG. 1 is a sectional side elevation view of the present membrane system. TPO membrane 10 comprises an upper TPO membrane 12 and a lower TPO membrane 14. Inserted between TPO layers 12 and 14 is a scrim layer 20. It is to be understood that materials other than TPO (such as EPDM or PVC) can instead be used for layers 12 and 14, all keeping within the scope of the present invention.

An adhesive layer 30 is applied on top of upper TPO layer 12, as shown. Specifically, adhesive layer 30 is applied across the top central portions of the surface of TPO layer 12, but does not fully extend to the edges of TPO layer 12, as shown. An optional release layer 40 can be placed on top of adhesive layer 30 so that membrane assembly 10 can be rolled up and easily transported to a jobsite. Once at the jobsite (which may be on top of a roof's building insulation, or alternatively, on the ground below grade onto which a concrete foundation is to be poured), the present membrane can be unrolled. Sections of the membrane assembly 10 can then be placed adjacent to one another such that their edges overlap (FIGS. 2A and 2B) and can then be thermally welded together. As such, the overlapping edges of the adjacent thermoplastic polymer membranes that do not have an adhesive layer applied thereto are between 3 and 6 inches wide.

Generally speaking, the present membrane system 10 comprises: a thermoplastic polymer membrane (layers 12 and 14); a reinforcing scrim 20 disposed within the thermoplastic polymer membrane (i.e.: between layers 12 and 14); and a layer of adhesive 30 applied to a center portion of the thermoplastic polymer membrane but not applied to the edges of the thermoplastic polymer membrane.

In preferred aspects, scrim layer 20 is made of a woven polymer, including but not limited to, polyester. Scrim 20 is preferably positioned within the thermoplastic polymer membrane, and most preferably the reinforced scrim 20 is inserted between layers 12 and 14 as these TPO (or other suitable thermoplastic polymer membrane) layers are extruded.

Figure 2A:
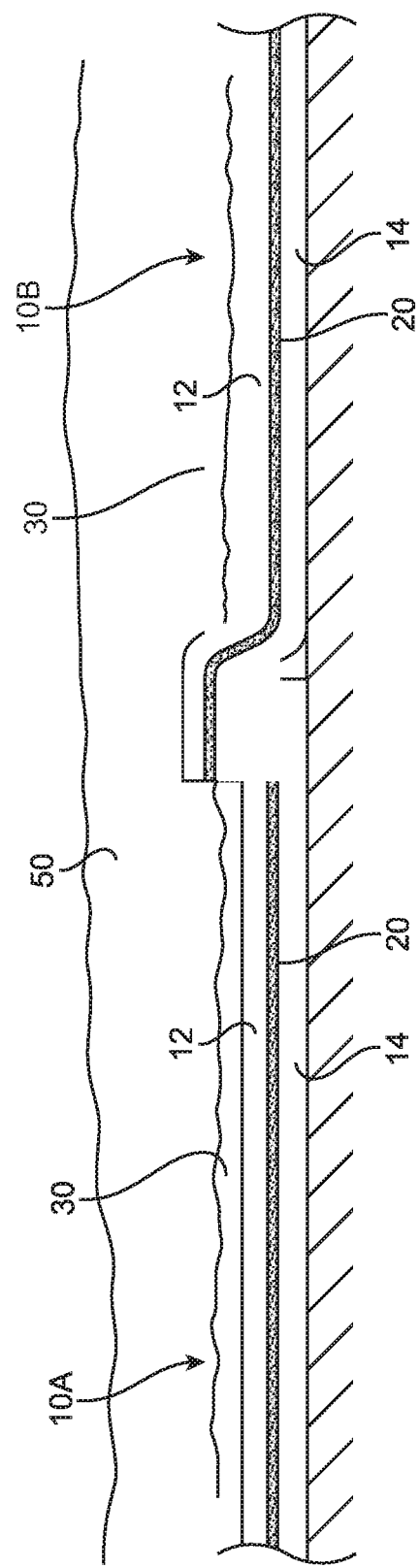
FIG. 2A is a sectional side elevation view of two adjacent overlapping sheets of the present membrane as used in a blindside waterproofing system for sealing and waterproofing under a building's foundation. The system is shown after it has been placed on the ground and its release layer has been removed, the edges of adjacent membranes have been thermally welded together, and the concrete has been poured thereover to complete the building foundation. (The vertical dimension has been exaggerated in this illustration to clearly show the various layers of the invention).

As seen in FIG. 2A, a plurality of membrane assemblies 10 can be used to provide blindside waterproofing underneath a cement building foundation. Specifically, a number of membrane assemblies 10 can be positioned next to one another on the ground (for example, with the edges of membrane assembly 10A and 10B shown overlapping. As can be seen, adhesive layer 30 does not fully reach to the side edges of membrane assemblies 10A and 10B. This permits one assembly to overlap the edge of the other (i.e.: with lower layer of TPO membrane 14 of assembly 10B placed on top of the upper layer of TPO membrane 12 of assembly 10A). As such, these edges can then be thermally welded together with no interference from the adhesive. After the edges are thermally welded together, a layer of concrete 50 is poured thereover to provide the building foundation. This is an example of blindside waterproofing (i.e.: where the waterproofing is outside the building structure and is not reachable). It is critical that the membranes 10A and 10B, etc. provide a waterproof seal since there is no going back to make corrections or adjustments after the cement foundation 50 has been laid down. The present scrim-reinforced membrane is ideally suited for exactly this situation.

Figure 2B:
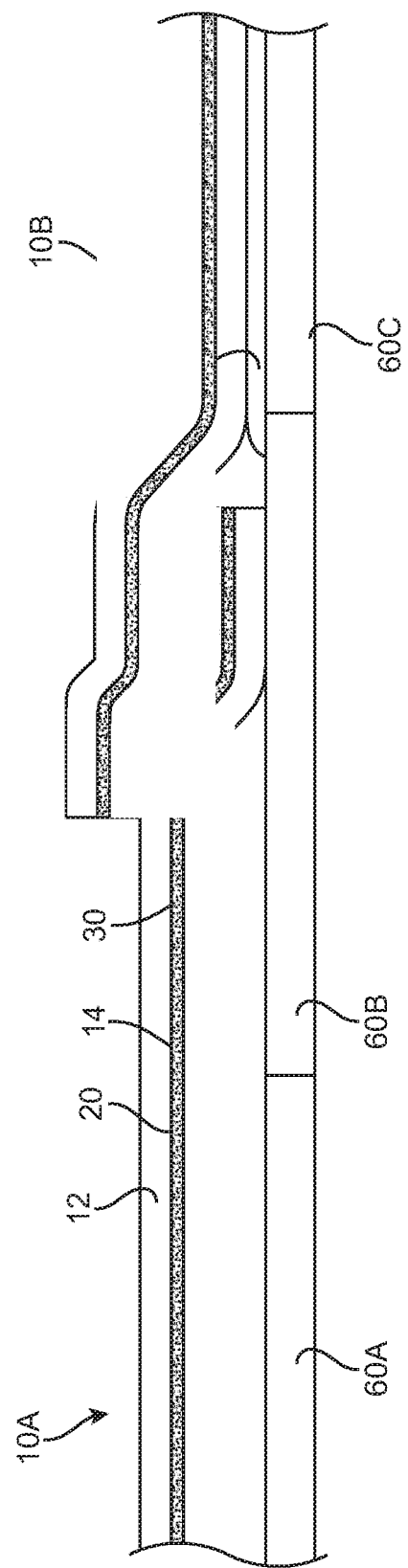
FIG. 2B is a sectional side elevation view of two adjacent overlapping sheets of the present membrane as used in a roofing application. The system is shown after the release layer has been removed, and the membrane flipped over such that the adhesive seals face down onto the top of a layer of roofing building insulation blocks. (The vertical dimension has been exaggerated in this illustration as well to clearly show the various layers of the invention).

As seen in FIG. 2B, the present membrane assemblies 10A and 10B can also be used in a roofing application. Specifically, membrane assemblies 10A and 10B can be positioned on top of building insulation blocks 60A, 60B, 60C, etc. As can be seen, in this application, the membrane assemblies are flipped over such that the adhesive layers 30 are now downwardly facing. As such, adhesive layer 30 fully adheres the membranes 10A and 10B onto the top of building insulation blocks 60. As can also be seen, the adhesive layer 30 does not extend to the side edges of membrane assemblies 10A and 10B thereby permitting the side edges of the membrane assemblies to be overlapped (and thermally welded to one another similar to FIG. 2).

Preferably, in the applications of FIGS. 2A and 2B, the reinforcing scrim 20 is coated with at least one of EVA, polyolefins, or polyacrylates and then thermally annealed.

What is claimed is:

1. A membrane system, comprising:
a thermoplastic polymer membrane;
a waterproof, puncture resistant reinforcing scrim disposed within the thermoplastic polymer membrane, the waterproof and non-wicking, puncture resistant reinforcing scrim having a uniform construction across the thermoplastic polymer membrane to the edges of the thermoplastic polymer membrane; and
a layer of adhesive applied to a center portion of the thermoplastic polymer membrane but not applied to the edges of the thermoplastic polymer membrane such that the edges of the thermoplastic polymer membrane can be thermally welded to an adjacent thermoplastic polymer membrane without fasteners passing through the waterproof and non-wicking, puncture resistant reinforcing scrim.

2. The membrane system of claim 1, wherein the thermoplastic polymer is TPO.

3. The membrane system of claim 1, wherein the reinforcing scrim is thermally annealed.

4. The membrane system of claim 1, wherein the reinforcing scrim is coated with at least one of EVA, polyolefins, or polyacrylates.

5. The membrane system of claim 1, wherein the reinforced scrim is positioned centrally in the thermoplastic polymer membrane, and the reinforced scrim is inserted between two layers of extruded thermoplastic polymer membrane.

6. The membrane system of claim 1, wherein the adhesive is a concrete activated adhesive.

7. The membrane system of claim 1, wherein the reinforcing scrim is made of a woven polymer.

8. The membrane system of claim 7, wherein the woven polymer is polyester.

9. The membrane system of claim 1, wherein the edges of the thermoplastic polymer membrane that do not have an adhesive layer applied thereto are between 3 and 6 inches wide.

10. The membrane system of claim 1, further comprising:
a release layer disposed over the adhesive layer.

* * * * *